(12) United States Patent
Mitreuter et al.

(10) Patent No.: US 9,264,424 B2
(45) Date of Patent: Feb. 16, 2016

(54) METHOD FOR PROTECTING AN INTERNET SUPPLEMENTARY SERVICE

(75) Inventors: Ulrich Mitreuter, Königsdorf (DE); Renate Zygan-Maus, München (DE)

(73) Assignee: Siemens Aktiengesellschaft, Munich (DE)

( * ) Notice: Subject to any disclaimer, the term of this patent is extended or adjusted under 35 U.S.C. 154(b) by 1606 days.

(21) Appl. No.: 10/221,519

(22) PCT Filed: Aug. 28, 2001

(86) PCT No.: PCT/EP01/09909
§ 371 (c)(1),
(2), (4) Date: Jul. 9, 2003

(87) PCT Pub. No.: WO02/19657
PCT Pub. Date: Mar. 7, 2002

(65) Prior Publication Data
US 2004/0015577 A1    Jan. 22, 2004

(51) Int. Cl.
*G06F 15/16* (2006.01)
*H04L 29/06* (2006.01)
*H04Q 11/04* (2006.01)

(52) U.S. Cl.
CPC ............ *H04L 63/083* (2013.01); *H04L 63/126* (2013.01); *H04Q 11/0457* (2013.01); *H04Q 2213/13095* (2013.01); *H04Q 2213/13097* (2013.01); *H04Q 2213/13174* (2013.01); *H04Q 2213/13196* (2013.01); *H04Q 2213/13204* (2013.01); *H04Q 2213/13209* (2013.01); *H04Q 2213/13215* (2013.01); *H04Q 2213/13298* (2013.01); *H04Q 2213/13339* (2013.01); *H04Q 2213/13389* (2013.01)

(58) Field of Classification Search
CPC ............................ H04L 63/083; H04L 63/126
USPC ......... 709/200, 203, 223, 225, 227, 229, 230;
713/168–170
See application file for complete search history.

(56) References Cited

U.S. PATENT DOCUMENTS

| | | | | |
|---|---|---|---|---|
| 5,918,019 | A * | 6/1999 | Valencia ....................... | 709/227 |
| 6,275,934 | B1 * | 8/2001 | Novicov et al. ............... | 713/168 |
| 6,512,754 | B2 * | 1/2003 | Feder et al. ................... | 370/338 |
| 6,665,718 | B1 * | 12/2003 | Chuah et al. .................. | 709/225 |
| 6,675,208 | B1 * | 1/2004 | Rai et al. ....................... | 709/224 |

(Continued)

FOREIGN PATENT DOCUMENTS

WO    00/30369    5/2000    ............... H04Q 3/00

OTHER PUBLICATIONS

Stephen Kent et al., "Secure Border Gateway Protocol (S-BGP)", IEEE Journal on Selected Areas of Communications, vol. 18, No. 4, Apr. 2000, pp. 582-592.

*Primary Examiner* — Minh-Chau Nguyen
(74) *Attorney, Agent, or Firm* — Staas & Halsey LLP

(57) ABSTRACT

The invention relates to a method for improving the security of an Internet supplementary service. When access to the IP server network of a network operator is sought for an ISS message from the Internet, a service-independent authorization procedure is carried out by a purpose-built server, a service-independent identification being used to obtain said authorization. A service-related authorization procedure is subsequently carried out by a service access server, by means of a user password.

5 Claims, 1 Drawing Sheet

(56) References Cited

U.S. PATENT DOCUMENTS

| | | | |
|---|---|---|---|
| 6,857,073 B2 * | 2/2005 | French et al. | 713/168 |
| 6,898,188 B1 * | 5/2005 | Hamami | 370/252 |
| 6,940,847 B1 * | 9/2005 | Glitho et al. | 370/352 |
| 6,986,050 B2 * | 1/2006 | Hypponen | 713/183 |
| 7,039,027 B2 * | 5/2006 | Bridgelall | 370/329 |
| 7,116,646 B1 * | 10/2006 | Gustafson et al. | 370/313 |
| 7,145,898 B1 * | 12/2006 | Elliott | 370/352 |
| 7,171,205 B2 * | 1/2007 | Gallagher et al. | 455/436 |

\* cited by examiner

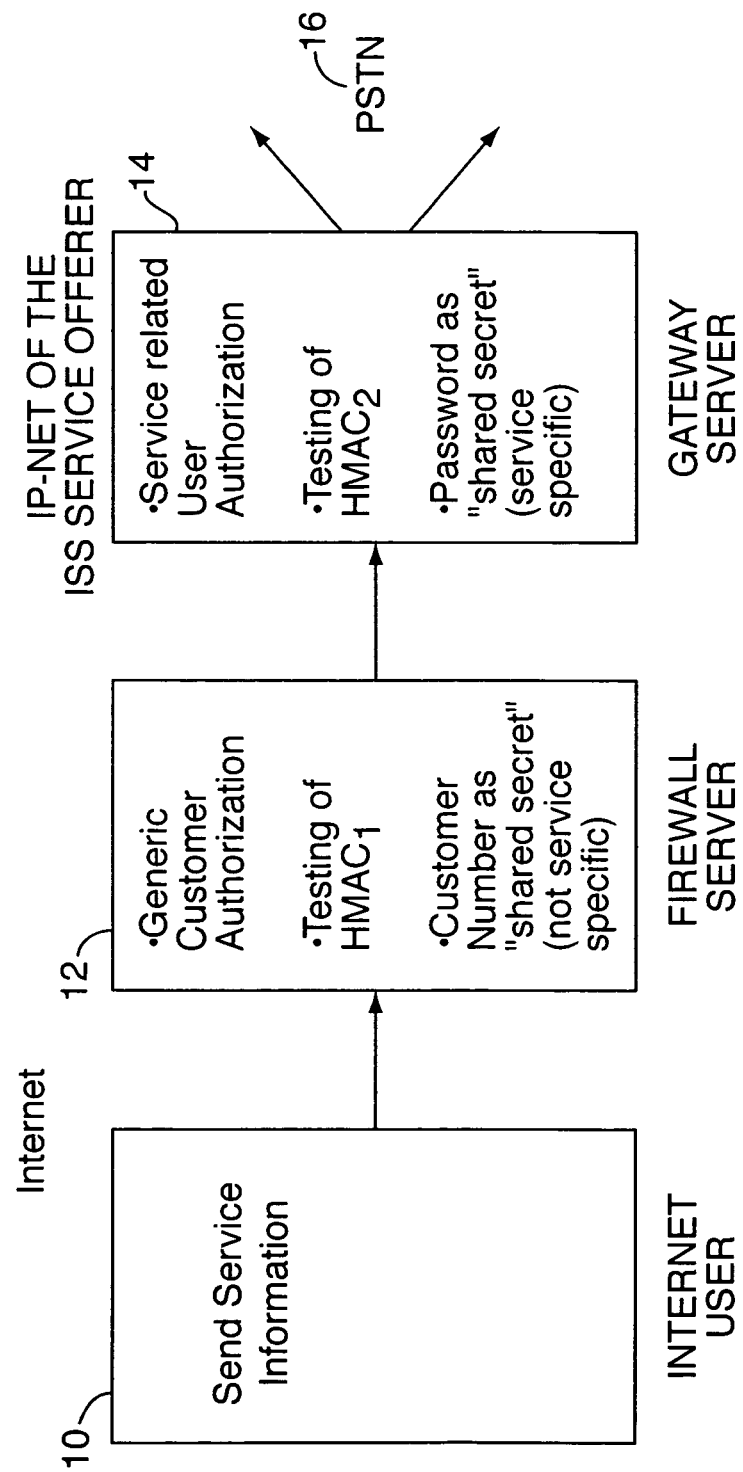

METHOD FOR PROTECTING AN INTERNET SUPPLEMENTARY SERVICE

CROSS-REFERENCE TO RELATED APPLICATIONS

This application is entitled to the benefit of and incorporates by reference essential subject matter disclosed in International Patent Application PCT/EP01/09909 filed on Aug. 28, 2001 and European Patent Application No. 00118893.7 filed on Aug. 31, 2000.

BACKGROUND OF THE INVENTION

For the realization of Internet Supplementary Services (for example, Call Waiting Internet Busy, Subscriber Controlled Input via Internet) information is required (hereinafter called Service Information), which is exchanged between Internet users and PSTN/ISDN exchanges. Thereby there arises the following security demands:

a) the resources of the network of a telecommunications operator (PSTN/ISDN network, internal server net) must be protected against unauthorized access (access by Internet users who are not customers of the telecommunications operator).

b) the source of the service information must be authenticated and the non-falsification of the service information must be verified.

c) the access of the user to the service must be authorized.

Standard methods for the protection of signaling information for Internet supplementary services have not previously existed. Depending on the service different combinations of IP-security methods have been used. In many cases a common secret (for example, a password, a PIN) coded by standard methods (for example, "Transport Layer Security", RFC 2246) has been transmitted to the server which supports the service as a gateway into the PSTN/ISDN. At this server the password is evaluated based on interfaces to corresponding service related data bases of the PSTN/ISDN network operator, which can be either network central databases (in the gateway server or separate) or databases which are distributed in the networks of the subscriber's exchanges. With such methods requirements b) and c) can be filled, however, not requirement a) at the same time.

Based on the foregoing, it is the general object of the present invention to overcome or improve upon the drawbacks and problems associated with the prior art.

SUMMARY OF THE INVENTION

The method for protecting service information from Internet supplementary services users is divided into two steps. Upon access from the Internet to the IP-server net of the network operator, through a special security server (firewall server) a generic, that is a service independent, authorization is provided, for which a service independent identifier, for example the customer number, is used. Then from a service access server a service related authorization is provided, for which a service related (service specific) secret (for example a user password, a PIN) is used. Neither the customer number nor the service related secret is transmitted over the Internet (as explained later in more detail). A subscriber identifier of the ISS subscriber, for example the call number, is transmitted in plain text (Klartext) over the Internet and assists the receiver (security server or service access server) to determine the associated common secret (service independent identifier or service related secret), with which it can test the involved authorization. The security server and the service access server can especially be realized on a hardware platform.

BRIEF DESCRIPTION OF THE DRAWINGS

The sole drawing schematically illustrates a method for protecting an Internet supplementary services embodying the present invention.

DETAILED DESCRIPTION OF THE PREFERRED EMBODIMENT

Referring to the sole drawing a service independent identifier, for example the customer number of the subscriber or internet user 10, serves as the common secret (shared secret) for the forming of a cryptographic test sum, for example according to the standard method (RFC 2104) of the "Hashed Message Authentication Code", which as a so called "digital signature" is appended to the service information. A generic security server (firewall server) 12 evaluates the HMAC-test sum of the received service information, based on interfaces to the databases of the PSTN/ISDN net operator for the customer number and the call number. Upon a successful HMAC-test (by which the customer authentication and the data integrity is assured) the subscriber receives access to the service net of the operator.

The information is routed to the appertaining service access server which enables the access to the Internet Supplementary Service, and here the service specific authorization (the service access server can especially concern a gateway server 14 (see the FIGURE) which enables access to an Internet Supplementary Service offered by another net). In addition, the service access server evaluates a second "Hashed Message Authentication Code" which has been formed from the IP-application of the user with the assistance of a service related secret. The service access server evaluates the HMAC based on interfaces to the service related databases of the PSTN/ISDN net operator 16, which contain the service related secrets of the service subscribers. These can be either net central databases (in the gateway server or separate) or also databases which are distributed in the net at the subscriber exchanges.

In operation, sender appends to the service information, before its sending, the common secret (here for example the customer number or user password) and forms by way of either the test sum. Then the customer number or password is removed, the test sum is appended to the service information and the information is sent. The receiver removes the test sum, appends the customer number or the password (taken from his databank) to the service information and calculates likewise the test sum. A successful comparison of the received with the calculated test sum indicates first, that the sender knows the customer number or password, and second, that the information has not been changed by the transmission (which would have changed the test sum). The customer number or password has therefore been transmitted neither in clear text nor in code. Nevertheless, the sender indicates that he knows the correct password.

By way of the described two step process it is possible to fill the demands a), b) and c) and at the same time to use existing password databases in the exchanges and existing databases of the net operator. Thereby one spares the installation and maintenance of additional external databanks and the eventual doubling of security relevant data (for example in the exchanges and at the external servers). Because of the possibility of reuse of already existing passwords on PIN's, the ISS subscriber need bear in mind no additional password for Internet Supplementary Services. Exchange internal databanks are not accessible from the outside and therefore are generically more secure than databanks on servers. By way of the two step authentication the appearance of additional hurdles in the way is avoided. The costs of such two step authorization, because of the reuse of already existing databanks, are significantly lower than those of similarly secure protection methods, which undertake the entire subscriber authentication already in the security servers at the entrance to the IP server net.

In synopsis, it can be said that the invention describes a simple two step security method, that combines existing data (customer number, call number) and security methods for telecommunications nets (call number related PIN) with existing Internet security methods (HMAC).

What is claimed is:

1. A method for controlling access to a service of one network, the service being accessed via Internet, comprising:
    performing, by an access system using a firewall server of the one network upon receipt of a message relating to the service, a service-independent authorization based on a service-independent secret, the message relating to the service including a subscriber identifier of a subscriber of the network and having appended thereto a first checksum and a second checksum, the first checksum formed of the message and the service-independent secret and the second checksum formed of the message and a service-related secret;
    providing access to the service by the access system using a service access server of the one network to perform a service-related authorization based on the service-related secret after the service-independent authorization has yielded a positive result; and
    determining at least one of the service-independent secret for the service-independent authorization and the service-related secret for the service-related authorization using the subscriber identifier.

2. The method according to claim 1, wherein the subscriber identifier is a subscriber number of a subscriber of the one network, and/or the service-independent secret is a customer number of the subscriber and/or the service-related secret is a password.

3. The method according to claim 1, wherein the one network is a telephone network.

4. The method according to claim 1, wherein the service is an internet supplementary service.

5. An access system of one network for controlling access to a service, comprising:
    a first server computer accessed via the one network and performing, upon receipt of a message relating to the service, a service-independent authorization based on a service-independent secret, the message relating to the service including a subscriber identifier of a subscriber of the network and having appended thereto a first checksum and a second checksum, the first checksum formed of the message and the service-independent secret and the second checksum formed of the message and a service-related secret, said first server computer determining the service-independent secret based on the subscriber identifier; and
    a second server computer accessed via the one network and performing, after the service-independent authorization has yielded a positive result, a service-related authorization enabling access to the service based on the service-related secret determined based on the subscriber identifier.

* * * * *